April 17, 1956 G. C. SZIKLAI 2,742,524

COLOR TELEVISON REPRODUCING SYSTEMS

Original Filed Sept. 24, 1949 2 Sheets-Sheet 1

INVENTOR
George C. Sziklai
BY
ATTORNEY

COLOR TELEVISON REPRODUCING SYSTEMS

Original Filed Sept. 24, 1949 2 Sheets-Sheet 2

INVENTOR
George C. Sziklai
BY
Olin L. Whitehead
ATTORNEY 2,742,524

COLOR TELEVISION REPRODUCING SYSTEMS

George C. Sziklai, Princeton, N. J., assignor to Radio Corporation of America, a corporation of Delaware Continuation of application Serial No. 117,533, September 24, 1949. This application December 12, 1951, Serial No. 261,187

26 Claims. (Cl. 178—5.4)

Figure 1:
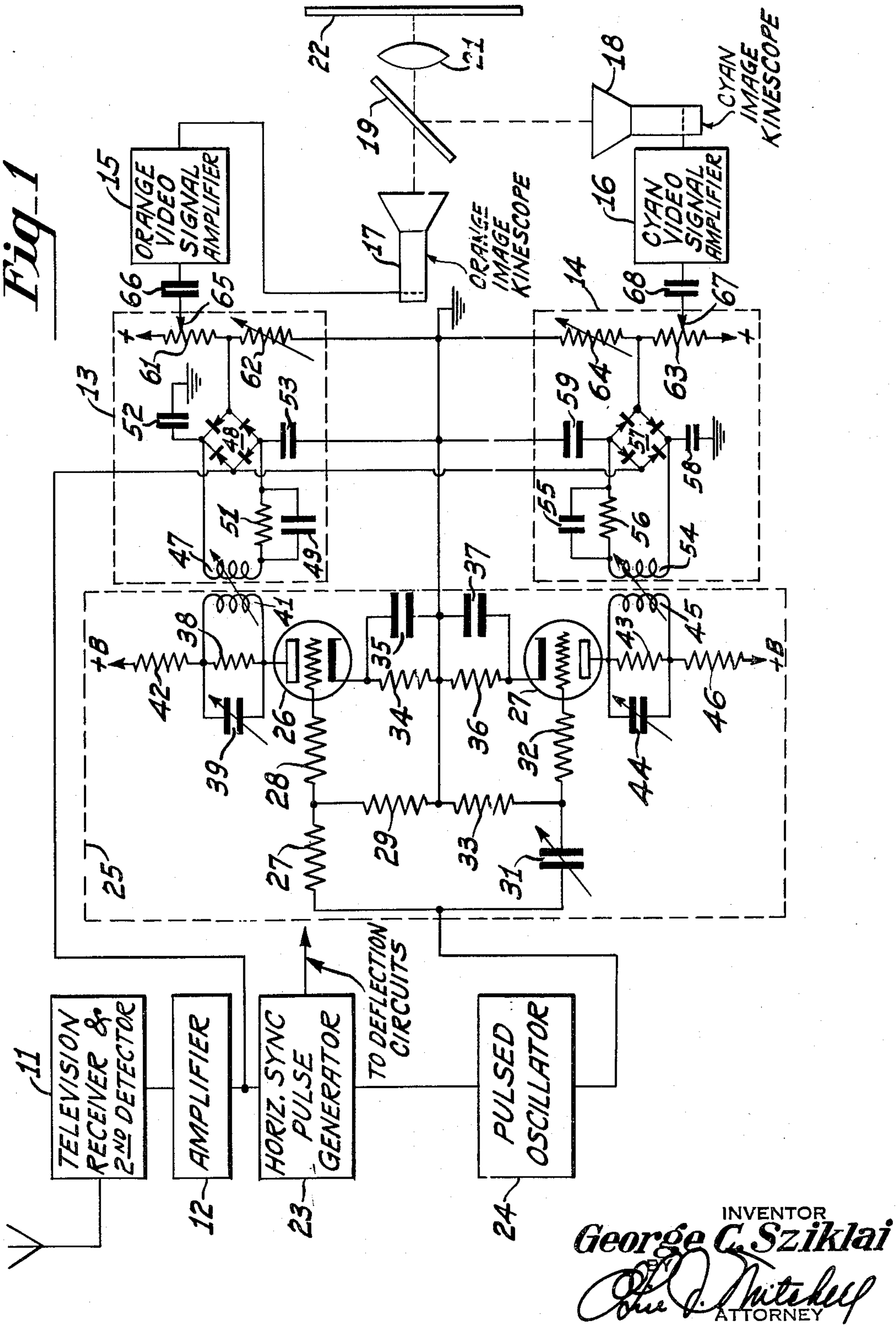

This invention relates to color television systems and particularly to systems and apparatus for reproducing images substantially in their natural colors.

This application is a continuation of my application, Serial No. 117,533, filed September 24, 1949, now abandoned, and entitled "Color Television Reproducing Systems."

There previously have been proposed numerous systems for the pickup, transmission and reception of video signals representative of selected primary color components of an image for the reproduction at a signal-receiving point of the original images substantially in their natural colors. In view of the fact that there presently is a large number of monochrome television receivers in daily operation, it is highly desirable that any color television system which is adopted be of such a character that it will not render obsolete any of the present monochrome receivers. Furthermore, it also is desirable that the color television system which is adopted to be of such a character that the modification of the existing monochrome receivers for the reproduction of colored images be made as simple as possible. In addition, in order to minimize the cost of a color television reproducing apparatus, it is necessary to add as few as possible components to the receiver and yet have the receiver capable of reproducing colored television images having a relatively high entertainment value.

One of the proposed color television systems operates according to the so-called dot multiplex principle and forms the subject matter of a copending U. S. application of John Evans, Serial No. 111,384, filed August 29, 1949 and entitled "Color Television." In such a system each small image area or element is divided into separate component primary colors and for each elemental area of the image, there are transmitted successively video signals representing respectively the component colors. The amplitude or energy content of these signals depends upon the component color content of each of a succession of image elemental areas. It has been determined that images may be reproduced in substantially their natural colors by utilizing only three component primary colors. However, an image reproducing apparatus, which is to be responsive to video signals of the character described, requires considerable apparatus in addition to that needed for monochrome image reproduction. For example, in one type of image reproducer, a separate kinescope and its necessary auxiliary apparatus, is required for each of the component primary colors which, in the case where three such colors are utilized, necessitates the employment of three kinescopes.

It has further been determined that reasonably good images may be reproduced in a smaller number of colors than those represented by the transmitted signals. In a three-color television system, for example, images may be reproduced in sufficiently close approximations of their original colors to provide considerable entertainment value by suitably combining different pairs of the three component primary colors. By taking advantage of this condition, some of the receiver kinescopes which otherwise would be needed may be eliminated so that in a three-color system, for example, only two kinescopes are necessary. Also, in an arrangement of this character, a much simpler optical system may be employed to combine in registry the partial color images of the two kinescopes than in the case where the combination of the partial color images produced by three or more kinescopes is required.

A further advantage may be derived, by the utilization of this knowledge of the capabilities of a system operating according to the dot multiplex principle, in the design of a relatively simple and inexpensive adaptor for use in conjunction with an existing monochrome receiver for the purpose of enabling it to reproduce images in substantially their natural colors.

An object of the present invention is to provide for obtaining, from a complex color signal obtained by sampling video signals representing different component colors at predetermined time intervals, a signal output representing samples of the complex color signal taken at other than the predetermined time intervals.

According to this invention, there may be advantageously provided an improved color television receiving system by which video signals generated and transmitted according to the dot multiplex or signal sampling principle may be satisfactorily reproduced in a smaller number of component colors than the total number of component colors represented by the received signals.

According to this invention in an aspect thereof, different pairs of the received color video signals are combined in such a manner as to produce single colors each of which, in effect, is a pre-selected mixture of the two colors represented by each of the pairs of signals. Such a result is produced according to this invention by suitably timing the impression of the received signals upon the image reproducing kinescopes to coincide with a selected interval occuring between the time of reception of the two color signals selected. The timing is effected by suitably phasing, with respect to the received signal wave, the operation of a plurality of keying or sampling devices interposed between the signal receiving circuits and the respective kinescopes.

Another object of the invention, therefore is to provide a relatively simple and effective color television receiving system, whereby the image may be reproduced in a smaller number of color components than are present in the received signals.

A further object of the invention is to provide an improved color television receiving system, whereby there may be utilized phases of the received three-color representative video signal wave which are different from those representing the original component image colors.

Still another object of this invention is to provide an improved color television receiving system, whereby an existing monochrome receiver may be easily adapted for the reception and reproduction of color television signals.

Figure 2:
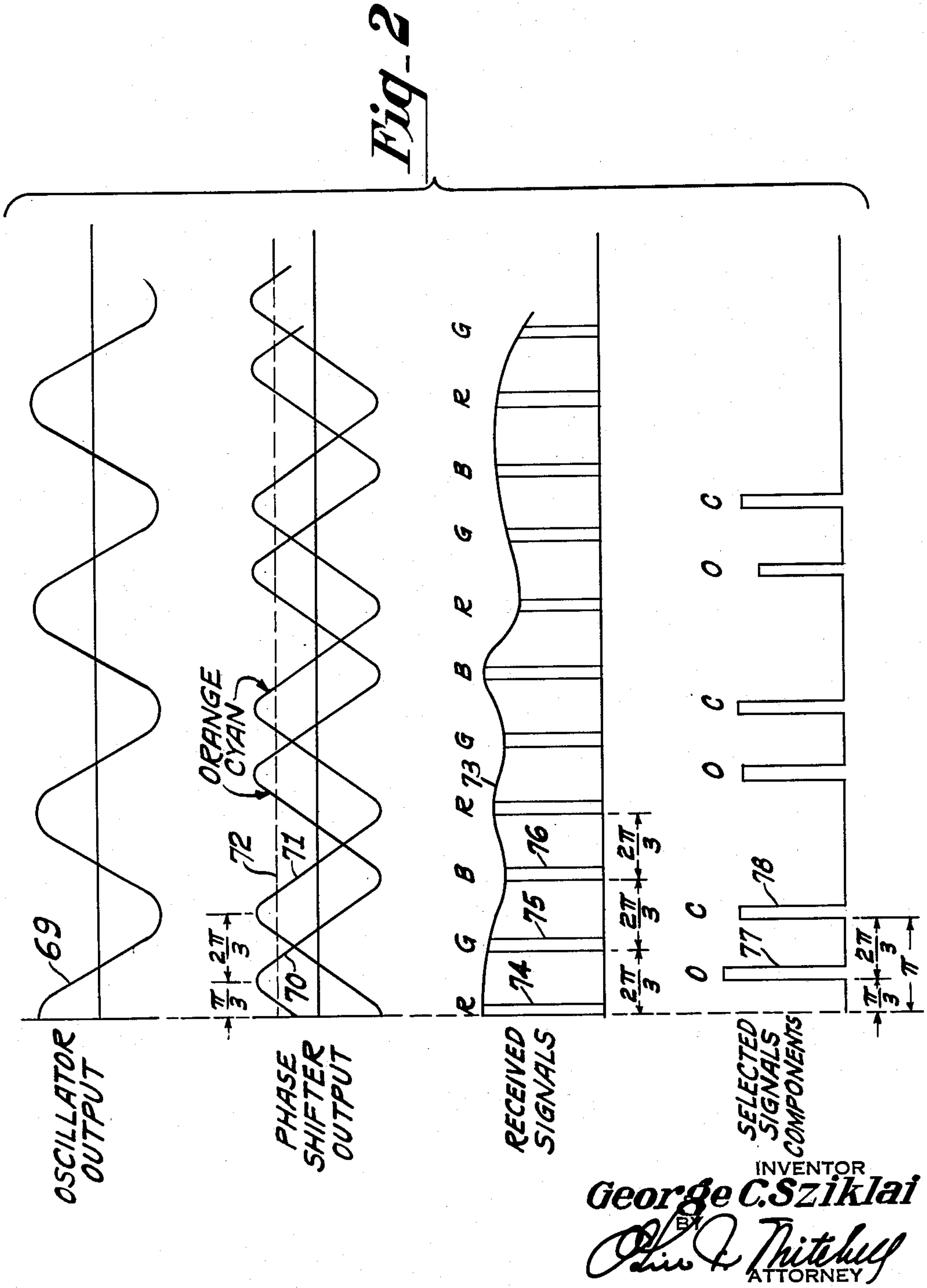

Other and incidental objects of the invention will be apparent to those skilled in the art from a reading of the following specification and an inspection of the accompanying drawings in which:

Figure 1 is a circuit diagram, partly in block form, of an illustrative embodiment of the invention; and Figure 2 is a graphical representation of the manner in which the apparatus of Figure 1 operates according to the invention.

Referring now particularly to Figure 1 of the drawings, there is illustrated a conventional television carrier wave receiver and signal detector 11 which it will be understood may include one or more stages of radio frequency amplification, a frequency converting stage, one or more stages of intermediate frequency amplification, and a second or signal detector by means of which the modulation envelope of the received carrier is recovered. The modulation envelope includes a portion which corresponds to a composite color video signal wave. The output of the receiver and detector apparatus 11 is coupled to an amplifier 12 which functions to amplify the composite television signal including the video and system control signals such as the synchronizing pulses. In the following description of an illustrative embodiment of the invention, it will be assumed that the received composite video signal wave comprises three individual color video signals representing respectively the green, red and blue color components of the original image; and the image which is to be reproduced will have orange (combination of green and red) and cyan (combination of blue and green) color components. The output of the amplifier 12 is coupled to the input circuits a pair of gating or keying devices 13 and 14 which normally are biased to a non-conducting, i. e. inoperative state. In such a state, the gating devices are inoperative to transfer signals from their input circuits to their associated output circuits. The output circuit of the keying device 13 is coupled to an orange video signal amplifier 15 which functions to amplify a selected combination of the green and red color video signals. Similarly, the output circuit of the keying device 14 is coupled to a cyan video amplifier 16 which functions to amplify a selected combination of the blue and green received color video signals. The output circuits of the video signal amplifiers 15 and 16 are coupled respectively to the electron beam intensity control electrodes of an orange image kinescope 17 and a cyan image kinescope 18. Each of these kinescopes may be provided with suitable color phosphors or filters, or both, and the images reproduced thereby suitably combined by means of a light divider 19 and a projection optical system 21 so as to reproduce the two partial color images exactly in register on a viewing screen 22.

The output circuit of the amplifier 12 also is coupled to a horizontal synchronizing pulse generator 23 by means of which the synchronizing signals are conventionally separated from the video signals and impressed upon the deflection circuits for the image reproducing kinescopes as indicated. The output circuit of the horizontal synchronizing pulse generator 23 is coupled to the control circuit of a pulsed oscillator 24. The oscillator 24 may have any desired form such as, for example, that shown in the text book entitled "Wave Forms" published in 1949 by the McGraw-Hill Book Company, Inc., at page 143, Figure 4–45. The details of such an oscillator also are shown in the copending application of John Evans referred to previously. It only is essential that the oscillator be capable of stable oscillation at a frequency corresponding to the frequency of each of the component color signals and be susceptible of control by means of the horizontal or line frequency synchronizing pulses. The output of the pulsed oscillator 24, therefore, is a sinusoidal voltage having the frequency of any one of the received color television video signals which is impressed upon a phase shifting device 25. The phase shifting device is provided with two output circuits in respective ones of which are developed voltage impulses at the frequency of the color television signals.

The output circuit voltages of the phase shifting device, however, are 120 electrical degrees out of phase, and are respectively coupled to the keying devices 13 and 14 so that they are rendered operative respectively 120 degrees out of phase with one another. Furthermore, the output circuit voltages of the phase shifting device are phased relative to the received composite three-color video signal wave so that the keying devices are rendered operative at suitable intervals occurring between the reception of different pairs of color video signals to impress properly mixed signals upon the kinescopes 17 and 18, whereby to reproduce the desired color combinations.

The phase shifting device 25 comprises two electronic tubes 26 and 27 which for simplicity, are shown herein as triodes. It will be understood, however, that the invention is not necessarily limited to the use of tubes of this character but may instead embody other types of tubes such as pentodes, for example. The two tubes 26 and 27 are provided respectively with input and output circuits of a character to permit the development in the respective output circuits of voltages having the desired phase relationship to control the operation of the keying devices 13 and 14 in the manner described. Specifically, the output circuit of the pulsed oscillator 24 is coupled to the control grid of the tube 26 by a circuit which includes the series resistors 27 and 28 and a resistor 29 connected in shunt to ground. The output circuit of the oscillator 24 also is coupled to the control grid of the tube 27 by a circuit which includes the series arrangement of a capacitor 31 and a resistor 32 and also a resistor 33 connected in shunt therewith to ground. Preferably, the capacitor 31 is variable in order to suitably adjust the phase relationship of the output voltage of the tube 27 with respect to that of the tube 26 and also with respect to the received color video signals. Each of the tubes is provided with a conventional self-biasing circuit arrangement which for the tube 26 includes a resistor 34 and a by-pass capacitor 35 and for the tube 27 includes a resistor 36 and an associated by-pass capacitor 37.

The output circuit of the tube 26 includes a phase shifting network comprising a resistor 38 and a variable capacitor 39 connected in shunt therewith. A primary coupling transformer winding 41 also is connected to the anode of the tube 26 in parallel with the phase shifting network and space current for the tube is provided from a suitable source of energy indicated at +B through a voltage-dropping resistor 42. Similarly, the output circuit of the tube 27 includes a phase shifting network comprising a resistor 43 and a variable capacitor 44 connected in shunt therewith and also a coupling transformer primary winding 45 connected in parallel with the phase shifting network. Space current for the tube 27 is provided by means of a connection to a source of unidirectional energy indicated at +B through a voltage-dropping resistor 46.

The primary winding 41 is inductively coupled as indicated to a secondary winding 47 forming a part of the keying device 13. The secondary winding is coupled to conjugate terminals of a rectifier bridge network 48 by means including an energy storage network comprising a shunt arrangement of a capacitor 49 and a resistor 51 in order to bias the bridge network alternately for conduction and non-conduction for the desired selection of the received video signals for impression upon the orange kinescope 17. The biasing terminals to which the secondary winding 47 is connected may be by-passed to ground, if desired, by means of capacitors 52 and 53 in order to neutralize any distributed capacitance of the winding 47 and associated circuit elements.

In like manner, the primary winding 45 is inductively coupled to a secondary winding 54 included in the keying device 14 and this secondary winding is connected by means of a biasing network comprising a parallel connection of a capacitor 55 and a resistor 56 to conjugate biasing terminals of a rectifier bridge network 57, which terminals also may be by-passed to ground by neutralizing capacitors 58 and 59.

The composite received color video signal wave is impressed upon each of the networks 48 and 57 by means of a connection between the output circuit of the amplifier 12 and an input one of the other two conjugate terminals of the rectifier networks. The other, or output, terminals of the respective rectifier networks are connected to the respective output circuit impedance devices which for the keying device 13 includes resistors 61 and 62 connected between a suitable source of unidirectional positive voltage and ground and for the keying device 14 includes resistors 63 and 64 similarly connected.

A variable tap 65 on the resistor 61 is coupled by a capacitor 66 to the input circuit of the orange video signal amplifier 15. In like manner a variable tap 67 on the resistor 63 is coupled by a capacitor 68 to the input circuit of the cyan video signal amplifier 16. By such means, the selected combinations of the received color video signals are utilized to energize the orange and cyan kinescopes 17 and 18, respectively.

Before referring in detail to the manner in which the described apparatus operates, to effect a reproduction of a two-color image from a three-color received signal, reference will be made briefly to the manner in which the phase shifting device 25 may be adjusted to effect the desired phase relationship between the two output voltages thereof and also with respect to the received video signals. It is seen that the sinusoidal output voltage derived from the pulsed oscillator 24 is impressed upon the input circuit of the tube 26 substantially without any phase shifting.

However, by suitable adjustment of the variable capacitor 31, the phase of the voltage impressed upon the input circuit of the tube 27 may be shifted by as much 90° leading with respect to the phase of the voltage impressed upon the input circuit of the tube 26. Also, it will be seen that by suitable adjustments of the variable capacitors 39 and 44 included in the respective output circuits of the tubes 26 and 27, additional phase shifting of the voltages developed in the output circuits may be effected. Accordingly, it will be understood by those skilled in the art that it will be possible to effect a phase shift between the voltages developed in the respective primary windings 41 and 45 of such a character that the voltage in the winding 45 leads the voltage developed in the winding 41 by approximately 60°. If now the primary windings 41 and 45 are coupled to their respective secondary windings 47 and 54 in opposite polarity, the voltage developed in winding 47 leads the voltage developed in the winding 54 by approximately 120°. Furthermore, it will be understood that the capacitors 31, 39 and 44 are adjusted to produce the proper phase relationship between the voltages in the secondary windings and the received color video signals to impress properly mixed signals upon the kinescopes 17 and 18 so that they will display the desired combination colors.

Normally, the rectifier bridge networks 48 and 57 comprising the gating devices are biased to a non-conducting state so that the video signal voltages impressed upon the input terminals thereof do not effect the development of corresponding voltages in the output circuit thereof. The impulsive voltages which are developed in the secondary windings 47 and 54 in the manner described condition the respective networks 48 and 57 for momentary conduction, whereby those portions of the received composite color video signal wave which is impressed upon the input terminals of the networks are effective to develop corresponding mixed video signal voltages in the output circuits of the bridge networks for impression ultimately upon the respective kinescopes 17 and 18.

The manner in which the apparatus of Figure 1 operates to properly time the impression of the selected portions of the received composite color video signal wave upon the image reproducing kinescopes 17 and 18, whereby to develop a two-color image from three-color signals will best be understood by having additional reference to the curves of Figure 2. In Figure 2, the curve 69 represents the sinusoidal voltage wave derived from the output circuit of the pulsed oscillator 24 and having a frequency corresponding to the frequency of recurrence of any one of the three-color signal components. It will be understood that only the positive half cycles of this wave, or if desired only the crests of these positive half cycles, are effective to control the operation of the rectifier networks 48 and 57. It will be assumed for explanatory purposes that the crests of the wave 69 occur in substantial coincidence with the reception of those portions of the received composite color video signal wave which represent a particular color of the image to be reproduced. For example, in this case, it will be assumed that the crests of the wave 69 occur in coincidence with the reception of the red video signal components. It will be understood, however, that the crests of the wave 69 may occur coincidentally with any of the other color representative video signal components.

The curve 70 represents the waveform of the voltage developed in the secondary winding 47 of the apparatus of Figure 1, while the curve 71 is representative of the voltage of the secondary winding 54. It will be seen that, with respect to the oscillator output wave 69, the wave 70 has a lagging phase of approximately 60° or $3\pi/3$ radians. Also, by reason of the described 120° phase relationship between the voltages developed in the secondary windings 47 and 54, the wave 71 is lagging the wave 70 by substantially 120° or $2\pi/3$ radians. Preferably, the resistive-capacitive networks 49—51 and 55—56 of Figure 1 function to establish a clipping level indicated by the line 72 of Figure 2, so that only the crests of the waves 70 and 71 are effective to operatively condition the rectifier networks 48 and 57.

The curve 73 is generally illustrative of the form of the received composite color video signal wave and for purposes of illustration, there have been indicated the red, green and blue video signal components 74, 75 and 76 respectively which constitute the image information contained in the received carrier wave. The color video signals, it will be noted, are spaced in time relative to one another by substantially $2\pi/3$ radians, as indicated. In Figure 2, there also are indicated the selected video signal components by means of which the two-color image is to be reproduced from a received three-color video signal. In the illustrative embodiment of the invention the reproduced two-color image consists of the colors orange and cyan which are represented respectively by video signals 77 and 78. It will be noted that the orange video signals 77 are selected in coincidence with the crests of the wave 70 which lags the wave 69 by $\pi/3$ radians and, therefore occurs midway between the reception of the red and green video signal components 74 and 75. Similarly, the cyan video signal components 78 are selected under the control of the wave 71, the crests of which lag the crests of the wave 70 by $2\pi/3$ radians. Accordingly, the cyan video signal 78 is selected midway between the reception of the green and blue video signals 75 and 76 respectively.

In order to reproduce a completely accurate image from three-color received video signals, it is necessary that the received composite color video signal wave be sampled substantially in coincidence with the reception of the three-color component video signals. If sampled at any other time, the received composite color video signal wave represents a combination of two of the component colors in varying degrees of intensity. However, in accordance with the present invention, it is desired to sample the received composite color video signal wave at predetermined intervals intermediate of the pure color video signals in order to derive therefrom a video signal having an intensity which is representative of a preselected combination of two of the component colors. It has been determined that a two-color image may be reproduced from a three-color video signal by timing the receiving sampling for occurrence substantially midway between the reception of the two selected primary color representative video signals. For example, in order to derive a signal representative of the orange color component of the image to be reproduced, the received composite color video signal wave 73 is sampled at a point substantially midway between the red and green video signals 74 and 75, respectively, to thereby develop an orange video signal component 77. Similarly, the cyan video signal component 78 of the image to be reproduced is derived by timing the sampling operation to occur substantially midway between the green and blue video signals 75 and 76.

Consequently, when the rectifier bridge network 48 is rendered conducting under the control of the phase shifting tube 26 at a time which is substantially midway between the occurrence of the red and green video signals 74 and 75 of Figure 2, there is impressed upon the orange video signal amplifier 15 for subsequent control of the orange image kinescope 17 a video signal 77, the character of which is a combination of the red and green video signals and, therefore, is representative of the orange color component of the image to be reproduced. Similarly, the rectifier bridge network 57 is rendered conducting under the control of the voltage developed in the secondary winding 54 as a result of the operation of the phase shifting tube 27 at the time when the received composite color video signal wave 73 is substantially midway between the green and blue video signals 75 and 76 so that a cyan video signal 78 is impressed upon the cyan video signal 16 for ultimate control of the cyan reproducing kinescope 18.

It is to be understood that the invention is not necessarily limited to the details of the illustrative embodiment described, wherein the apparatus has been assumed to be adjusted in such a manner as to combine the green and red received video signals in suitable proportions to produce signals representative of the orange color component of the image, and the blue and green video signals are combined suitably to develop signals representative of the cyan color component of the image. It, also, is within the scope of the present invention to adjust the capacitors 31, 39 and 44 so as to select, from the received three-color video signal wave, properly timed voltage samples representative of a combination of the red and blue video signals. Such a combination may be used instead of either the green and red or the blue and green color combinations. It is seen that the particular color video signals, which are to be mixed for the development of a signal representative of a combination of any pair of the primary color components of the image, are selected by suitably adjusting the phase shifting device 25 so that the two voltages developed in the secondary windings 47 and 54 are properly phased with respect to the received three-color video signal wave to effect the operation of the keying devices 13 and 14 at the desired intervals occurring between the reception of the selected pairs of primary color video signals.

It also will be understood that the present invention is not limited for use with apparatus for reproducing a two-color image from three-color video signals. On the contrary, the principles disclosed in the illustrative embodiment of the invention may be employed with substantially equal facility for the reproduction of a color television image in any number of colors smaller than the number of colors represented by the received video signals. For example, either a two-color or a three-color image may be reproduced from received four-color video signals.

It also will be appreciated that the present invention has the advantage of providing a means for producing a relatively simple and inexpensive adaptor for the purpose of converting a monochrome receiver for the reproduction of a colored image. Such an adaptor embodying the invention requires a minimum number of additional apparatus components. For example, a monochrome receiver may be adapted to reproduce a two-color television image from video signals representing three or more color components by the addition of only one image reproducing device, together with the timing apparatus in accordance with the present invention for suitably energizing the two image reproducing devices.

There has also be proposed an arrangement for producing dot interlace in order to improve image reproduction. Methods and apparatus for producing dot interlace have been well shown and described in the copending U. S. applications to Randall Ballard entitled "Color Television Systems" SN 117,528, filed September 24, 1949, and Alfred C. Schroeder entitled "Color Television," SN 117,593, filed September 24, 1949. It will be understood that the present invention is applicable for the reproduction of images in color in conjunction with arrangements of the type suggested in the above identified application.

Accordingly, it is intended that the foregoing disclosure of an illustrative embodiment of the invention be considered as teaching the principles underlying the invention, the scope of which may be determined from the following claims.

1. In a multi-color television system wherein each elemental image area is represented by color signals producing a modulated envelope of a carrier wave, apparatus for reproducing said image in a smaller number of colors than are represented by said color signals, comprising an image reproducing device for each of the colors in which the image is to be reproduced, means for demodulating said carrier wave, and electronic switching means coupled between said demodulating means and said image reproducing devices for impressing momentarily said demodulated wave successively upon said image reproducing devices at predetermined intervals following the reception of predetermined ones of said color signals.

2. In a multi-color television system wherein each elemental image area is represented by successive groups of a plurality of time-spaced color signals producing an amplitude-modulated envelope of a carrier wave, apparatus for reproducing said image in a smaller number of colors than are represented by said color signals, comprising an image reproducing device for each of the colors in which the image is to be reproduced, means for demodulating said carrier wave, and electronic switching means coupled between said demodulating means and said image reproducing devices for impressing momentarily said demodulated wave successively upon said image reproducing devices at predetermined intervals between the occurrence of selected different pairs of said color signals, one pair of said color signals being selected for each color in which the image is to be reproduced.

3. In a multi-color television system wherein each elemental image area is represented by successive groups of a plurality of time-spaced primary color signals producing an amplitude-modulated envelope of a carrier wave, apparatus for reproducing said image in a smaller number of colors than are represented by said primary color signals, comprising means for receiving and demodulating said carrier wave, an image reproducing device for each of the colors in which the image is to be reproduced, means operative for short periods at predetermined times following the reception of predetermined ones of said primary color signals for selecting, from said demodulated wave, mixed color signal voltages, one of said mixed signal voltages being selected for each of the colors in which the image is to be reproduced, and means for impressing said selected mixed signal voltages respectively upon said image reproducing devices.

4. In a multi-color television system wherein each elemental image area is represented by color signals producing an amplitude-modulated envelope of a carrier wave, apparatus for reproducing said image in a smaller number of colors than are represented by said color signals, comprising means for receiving and demodulating said carrier wave, an image reproducing device for each of the colors in which the image is to be reproduced, electronic switching means for selecting, from said demodulated wave, mixed signal voltages intermediate of different pairs of said plurality of color signal voltages, one of said mixed signal voltages being selected for each of the colors in which the image is to be reproduced, and means for impressing said selected mixed signal voltages respectively upon said image reproducing devices.

5. In a multi-color television system wherein each elemental image area is represented by successive groups of a plurality of time-spaced primary color signals producing an amplitude-modulated envelope of a carrier wave, apparatus for reproducing said image in a smaller number of colors than are represented by said color signals, comprising means for receiving and demodulating said carrier wave, an image reproducing device for each of the colors in which the image is to be reproduced, a source of timing impulses controlled by and operating in synchronism with said received primary color signals, means coupled to and controlled by said timing impulse source for selecting, from said demodulated wave, mixed color signal voltages comprising predetermined proportions of different pairs of said plurality of primary color signal voltages, one of said mixed signal voltages being selected for each of the colors in which the image is to be reproduced, and means for impressing said selected mixed signal voltages respectively upon said image reproducing devices.

6. In a three-color television system wherein each elemental image area is represented by three color signals producing a modulated envelope of a carrier wave, apparatus for reproducing said image in two colors, each being a predetermined combination of two different pairs of said three colors, comprising means for receiving and demodulating said carrier wave, two image reproducing devices for displaying respectively said two predetermined color combinations, and electronic switching means coupled to said receiving and demodulating means and to said image reproducing devices for momentarily impressing said demodulated wave alternately upon said image reproducing devices at predetermined intervals after the occurrence of two different ones of said three color signals.

7. In a three-color television system wherein each elemental image area is represented by three color signals producing an amplitude-modulated envelope of a carrier wave, apparatus for reproducing said image in two colors, each being a predetermined combination of two different pairs of said three colors, comprising means for receiving and demodulating said carrier wave, two image reproducing devices for displaying respectively said two predetermined color combinations, and electronic switching means coupled to said receiving and demodulating means and to said image reproducing devices for impressing said demodulated wave alternately upon said image reproducing devices at predetermined intervals substantially midway between the occurrence of two different pairs of said three color signals.

8. In a three-color television system wherein each elemental image area is represented by three color signals producing an amplitude-modulated envelope of a carrier wave, apparatus for reproducing said image in two colors, each being a predetermined combination of two different pairs of said three colors, comprising means for receiving and demodulating said carrier wave, two image reproducing devices for displaying respectively said two selected color combinations, and electronic switching means coupled to said receiving and demodulating means and to said image reproducing devices for impressing said demodulated wave alternately upon said image reproducing devices at predetermined intervals between the occurrence of two different pairs of said three color signals.

9. In a three-color television system wherein each elemental image area is represented by three color signals producing an amplitude-modulated envelope of a carrier wave, apparatus for reproducing said image in two colors, each being a predetermined combination of two different pairs of said three colors, comprising means for receiving and demodulating said carrier wave, two image reproducing devices for displaying respectively said two selected color combinations, electronic switching means for selecting, from said demodulated wave, portions intermediate of each of two different pairs of said three color signals, said selected wave portions being representative of said predetermined color combinations, and means for impressing said selected wave portions respectively upon said two image reproducing devices.

10. Apparatus for reproducing a two-color image from three-color signals, said signals constituting a wave having a varying amplitude representative of the three-color content of each of a succession of elemental image areas, said apparatus comprising a kinescope for each of the two colors in which the image is to be reproduced, a gating device having an input and an output for each of said kinescopes, said gating devices being normally inoperative to transfer signals from said inputs to said associated outputs and adapted to be operated periodically to transfer signals from said inputs to said associated outputs, means for effectively coupling said outputs respectively to said kinescopes to control the operation of said respective kinescopes, means for impressing said three-color signals simultaneously upon the inputs of both of said gating devices, and means for alternately operating said gating devices at predetermined intervals between selected pairs of said three-color signals.

11. In a two-color television system, means for receiving a carrier wave having a signal-modulated envelope varying in amplitude in accordance with the three primary color content of successive elemental image areas, a source of timing impulses having a frequency corresponding to the frequency of any one of said color signals, a first image reproducing device for displaying a first combination of two of said primary colors, a second image reproducing device for displaying a second and different combination of two of said primary colors, two normally inoperative keying devices coupled respectively to said image reproducing devices and to said receiving means and respectively operative at different times to render the associated image reproducing devices responsive to selected portions of said modulation envelope, and a phase shifting device coupled to said timing impulse source and to said respective keying devices to condition said keying devices for individual operation at predetermined intervals occurring between the reception of two different pairs of said color signals.

12. In a two-color television system, means for receiving a carrier wave having an amplitude-modulated envelope produced by recurring series of time-spaced signals respectively representative of three primary colors of successive elemental image areas, means coupled to said receiving means for developing a train of timing impulses having a frequency corresponding to the recurrence frequency of any one of said color signals, a first image reproducing device for displaying a first combination of two of said primary colors, a second image reproducing device for displaying a second and different combination of two of said primary colors, two normally inoperative keying devices coupled respectively to said image reproducing devices and to said receiving means and individually operative to render the associated image reproducing devices responsive to selected portions of said modulation envelope, and a phase shifting device coupled between said timing impulse developing means and said respective keying devices to condition said keying devices for alternate operation at predetermined intervals occurring between the reception of two different pairs of said color signals.

13. In a three-color television system wherein each elemental image area is represented by three 120° out-of-phase color signals producing an amplitude-modulated envelope of a carrier wave, apparatus for reproducing said image in two colors, each being a predetermined combination of two different pairs of said three colors, comprising means for receiving and demodulating said carrier wave, two image reproducing devices for displaying said two predetermined color combinations, electronic switching means operating to momentarily impress said demodulated waves alternately upon said image reproducing devices, and means operating synchronously with said received signals for operatively controlling said switching means at predetermined intervals substantially 60° out-of-phase with two different ones of said color signals.

14. In a color television system, signal producing apparatus comprising in combination, means receiving a composite video signal wave the amplitudes of which at predetermined phases represent respectively a plurality of component colors of a subject, video signal-deriving apparatus responsive to said composite wave and operable by control waves of suitable phases to derive individual video signals from said composite wave representative of subject colors indicated by said control wave phases, and means to impress polyphase control waves upon said video signal-deriving apparatus for operating said apparatus in phases at least one of which is different from said predetermined phases, whereby said produced individual video signals respectively represent a plurality of colors at least one of which differs from said subject component colors.

15. In a color television system, signal producing apparatus comprising in combination, means receiving a composite video signal wave the amplitudes of which at predetermined phases represent respectively a plurality of component colors of a subject, video signal-deriving apparatus coupled to said receiving means and operable in response to control waves of suitable phases and to said composite video signal wave to derive individual video signals from said composite wave, and means coupled to and impressing control waves of different phases upon said video signal-deriving apparatus for operating said apparatus in phases other than said predetermined phases, whereby said produced individual video signals respectively represent a plurality of colors differing from said subject component colors.

16. In a color television system, signal producing apparatus comprising in combination, means receiving a composite video signal wave having a predetermined color repetition frequency and the amplitudes of which at predetermined phases represent respectively a plurality of component colors of a subject, apparatus coupled to said receiving means and operable in response to a control wave and to said composite video signal wave to derive individual video signals from said composite wave, a source of a control wave having said predetermined frequency, and means impressing said control wave upon said apparatus in phases, other than said predetermined phases, whereby said derived individual video signals respectively represent a plurality of colors differing from said subject component colors.

17. In a multi-color television system wherein a composite video signal wave of predetermined frequency has instantaneous amplitudes representative respectively of the color components of successive elemental areas of an image to be reproduced, composite video signal wave receiving apparatus comprising, video signal-deriving means operable to produce individual video signals representative respectively of the colors in which said image is to be reproduced, means impressing said composite video signal wave upon said signal-deriving means, a source of a reference wave having said predetermined frequency, means coupled to said reference wave source to develop a different phase of said reference wave for each of the colors in which said image is to be reproduced, and means impressing respective phases of said reference wave upon said signal-deriving means to produce said individual color-representative video signals, the particular colors represented by said individual video signals being dependent upon the phase relationship of said individual reference wave phases and said composite video signal wave, said reference wave phases having a relationship to said composite video signal wave differing from that of said instantaneous video signal wave amplitudes.

18. In a multi-color television system wherein a signal wave of predetermined frequency has amplitude and phase variations representative respectively of the saturation and hue of successive elemental areas of a color image to be reproduced, predetermined phases of said signal wave representing predetermined component colors of said image, signal wave receiving apparatus comprising means for obtaining said signal wave of predetermined frequency, color-representative video signal-deriving means, a source of a reference wave having said predetermined frequency, means coupled to said reference wave source to develop a different phase of said reference wave for each of the colors in which said image is to be reproduced, and means impressing respective phases of said reference wave and the obtained signal wave upon said signal-deriving means to produce individual color-representative video signals, the particular colors represented by said individual video signals being dependent upon the phase relationship of said individual reference wave phases and said obtained signal wave, said reference wave phases having a relationship to said video signal wave differing from said predetermined phases.

19. Color television receiving apparatus for reconstituting an image signal in color controlled by reception of a signal wave of a selected frequency having imposed thereon phase and amplitude changes which are representative respectively of the hue and saturation of successive elemental areas of a scanned image to be reproduced by said receiving apparatus, predetermined phases of said signal wave representing respectively predetermined component colors of said image; said receiving apparatus comprising means operable to obtain said signal wave, a reference wave source providing an unmodulated wave of said selected frequency, a plurality of separately adjustable means coupled to said reference wave source, each of said last named means being operable to develop a different phase of said reference wave, one phase for each of the selectable component colors in which the reproduced image is to be rendered, a plurality of signal sampling means, means for impressing the obtained signal wave and the respective phases of said reference wave each upon one of said sampling means to produce a plurality of individual color-representative video signals, the particular colors represented by said individual video signals being dependent upon the compared phase relationship of said individual reference wave phases and said obtained signal wave, said reference wave phases having a relationship to said obtained signal wave differing from said predetermined phases.

20. In a color television receiver for reproducing a two-color image from a video signal wave of a given frequency and having phase variations effectively indicative of the colors of an object, video signal producing apparatus including in combination: video signal-sampling means responsive to said video signal wave and operable by control waves of suitable phases relative to a predetermined phase of said video signal wave to derive individual color-indicative video signals from said video signal wave; and means to impress two control waves of said given frequency and having different phases relative to said predetermined phase of said video signal wave upon said sampling means to produce two video signals respectively indicative of the two colors in which said image is to be reproduced.

21. In a color television receiver for reproducing a two-color image from a video signal wave of a given frequency and having phase variations effectively indicative of the three-color content of an object, video signal producing apparatus including in combination: video signal-sampling means responsive to said video signal wave and operable by control waves of suitable phases relative to a predetermined phase of said video signal wave to derive individual color-indicative video signals from said video signal wave; and means to impress two control waves of said given frequency and having different phases relative to said predetermined phase of said video signal wave upon said sampling means to produce two video signals respectively indicative of two different colors of said object, said two different object colors being determined by the phase relationship of said control waves to a predetermined phase of said video signal wave.

22. In a color television receiver for reproducing a two-color image from a video signal wave of a given frequency and having amplitude and phase variations effectively indicative of the three-color content of an object, video signal producing apparatus including in combination: video signal-sampling means responsive to said video signal wave and operable by control waves of suitable phases relative to a predetermined phase of said video signal wave to derive individual color-indicative video signals from said video signal wave; and means to impress two constant amplitude control waves of said given frequency and of different phases relative to said predetermined phase of said video signal wave upon said sampling means to produce two video signals respectively indicative of two different colors of said object, said two different object colors being determined by the phase relationship of said control waves to said predetermined phase of said signal wave.

23. In a color television receiver adapted to receive a video signal wave having a given frequency, certain phases relative to a predetermined phase of said wave effectively indicating certain colors of an object, video signal producing apparatus including in combination: video signal-sampling means responsive to said received video signal wave and operable by control waves in suitable phases relative to said predetermined phase of said video signal wave to produce video signals respectively indicative of other object colors differing from said certain object colors; a source of control waves having said given frequency and having respective phases differing from said certain video signal wave phases and corresponding respectively to phases relative to said predetermined phase of said video signal wave which effectively indicate said other object colors; and means for impressing said control waves upon said sampling means to produce said video signals.

24. In a color television receiver adapted to receive a video signal wave having a given frequency, two phases relative to a predetermined phase of said wave effectively indicating two selected colors of an object, video signal producing apparatus including in combination: video signal-sampling means responsive to said received video signal wave and operable by control waves in suitable phases relative to said predetermined phase of said video signal wave to produce video signals respectively indicative of two object colors different from said two selected object colors; a source of two control waves having said given frequency and having respective phases differing from said two video signal wave phases and corresponding respectively to the two phases relative to said predetermined phase of said video signal wave which effectively indicate said two different object colors; and means for impressing said two control waves upon said sampling means to produce said video signals.

25. In a color television receiver adapted to receive a video signal wave having a given frequency, certain phases relative to a predetermined phase of said wave effectively indicating certain colors of an object, video signal producing apparatus including in combination: video signal-sampling means operable by control waves in suitable phases relative to said predetermined phase of said video signal wave to produce video signals respectively indicative of other object colors differing from said certain object colors; means for impressing said received video signal wave upon said sampling means; a source of a wave having said given frequency; means coupled to said wave source to develop two control waves having respective phases differing from said certain video signal wave phases and corresponding respectively to phases relative to said predetermined phase of said video signal wave which effectively indicate said other object colors; and means for impressing said control waves upon said sampling means to produce said video signals respectively indicative of said other object colors.

26. In a color television receiver adapted to receive a video signal wave having a given frequency, a given number of certain phases relative to a predetermined phase of said wave effectively indicating said given number of component colors of an object, video signal producing apparatus including in combination: video signal-sampling means responsive to said received video signal wave and operable by control waves in such given phase relationship to said predetermined phase of said video signal wave as to produce video signals effectively indicative of a number of component colors of said object smaller than said given number; a source of control wave energy having said given phase relationship to said predetermined phase of said video signal wave; and means for impressing said control wave energy upon said sampling means to produce said video signals.

References Cited in the file of this patent

UNITED STATES PATENTS

| | | |
|---|---|---|
| 2,554,693 | Bedford | May 29, 1951 |
| 2,559,843 | Bedford | July 10, 1951 |